US011037181B1

(12) United States Patent
Walton et al.

(10) Patent No.: US 11,037,181 B1
(45) Date of Patent: Jun. 15, 2021

(54) DYNAMICALLY DETERMINING RELATIVE PRODUCT PERFORMANCE USING QUANTITATIVE VALUES

(71) Applicant: Amazon Technologies, inc., Seattle, WA (US)

(72) Inventors: Christopher Walton, Glasgow (GB); Graham Ritchie, Edinburgh (GB); Paul Anthony Kotas, Seattle, WA (US); Sean Donahoe, Kirkland, WA (US); Oliver Masting, Edinburgh (GB); David Neil Turner, Edinburgh (GB); Ramesh Ravipati, Brooklyn, NY (US); José Lucas Lemos Mendonça, Edinburgh (GB); Sebastian Koch, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 15/826,168

(22) Filed: Nov. 29, 2017

(51) Int. Cl.
*G06Q 30/02* (2012.01)
(52) U.S. Cl.
CPC .............................. *G06Q 30/0202* (2013.01)
(58) Field of Classification Search
None
See application file for complete search history.

(56) References Cited

U.S. PATENT DOCUMENTS

| | | | | | |
|---|---|---|---|---|---|
| 5,953,707 | A | * | 9/1999 | Huang | G06Q 10/06 705/7.25 |
| 8,676,632 | B1 | * | 3/2014 | Watson | G06Q 30/0206 705/1.1 |
| 9,830,635 | B1 | * | 11/2017 | Levy | G06Q 30/0641 |
| 2016/0292703 | A1 | * | 10/2016 | Kolluru | G06Q 30/0202 |

OTHER PUBLICATIONS

Eun Joo Park, Eun Young Kim, Venessa Martin Funches, William Foxx, Apparel product attributes, web browsing, and e-impulse buying on shopping websites, Journal of Business Research, vol. 65, Issue 11, 2012, pp. 1583-1589, (Year: 2012).*

* cited by examiner

*Primary Examiner* — Arif Ullah
(74) *Attorney, Agent, or Firm* — Eversheds Sutherland (US) LLP

(57) ABSTRACT

Systems, methods, and computer-readable media are disclosed for dynamically determining relative product performance using quantitative values. In one embodiment, an example method may include determining, by one or more computer processors coupled to at least one memory, a first product of a product catalog, determining a first set of actual performance values for the first product during a first time period, generating a first expected performance model based at least in part on a first set of product attributes for the first product and the first set of actual performance values, determining a first expected performance value for the first product based at least in part on the first expected performance model and the first set of product attributes, determining a first average actual performance value for the first product over the first time period based at least in part on the first set of actual performance values, and determining a first relative performance value for the first product based at least in part on the first average actual performance value and the first expected performance value.

19 Claims, 9 Drawing Sheets

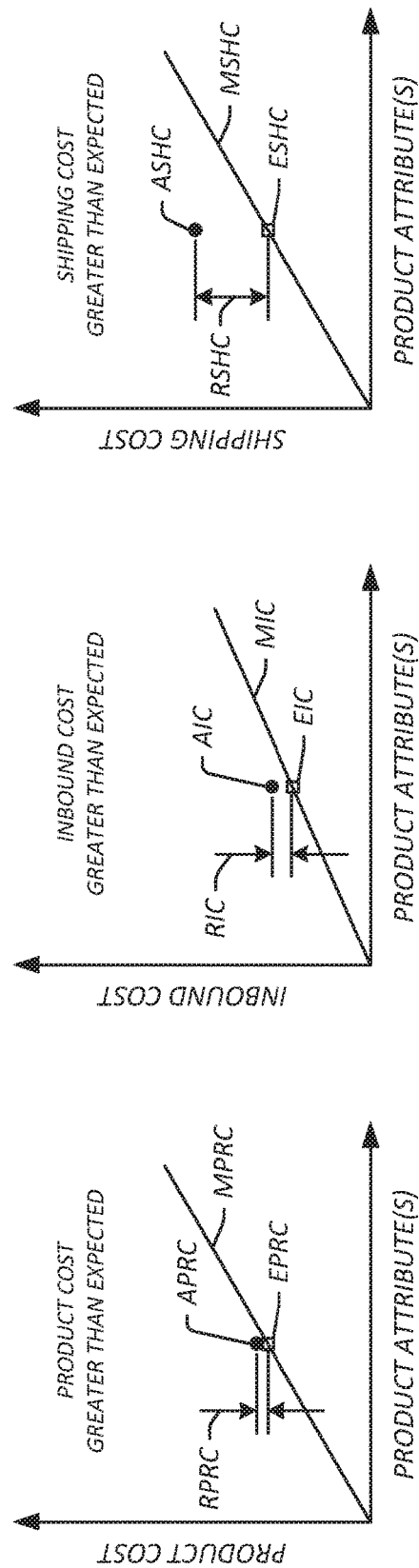
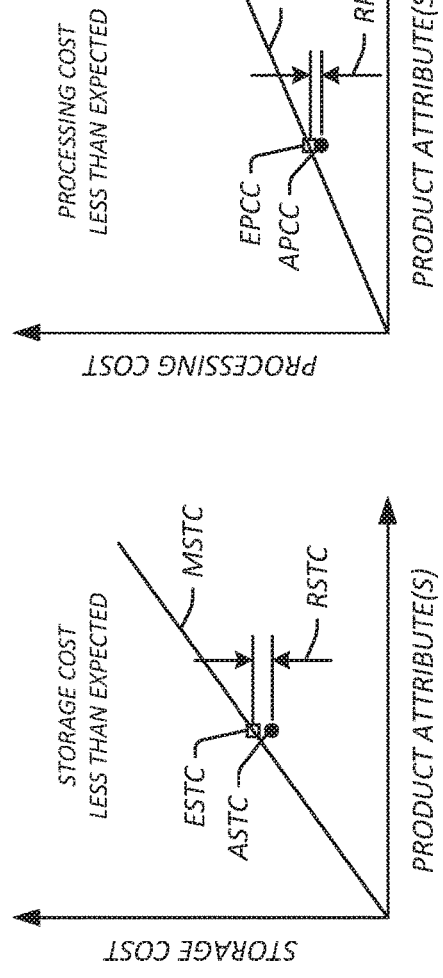

US 11,037,181 B1

DYNAMICALLY DETERMINING RELATIVE PRODUCT PERFORMANCE USING QUANTITATIVE VALUES

BACKGROUND

Electronic devices may be used to browse and purchase products offered for sale at online marketplaces. Certain online marketplaces may have a broad product catalog including a significant number of products having similar attributes. For example, the product catalog of an online marketplace may include multiple products of the same product type, which may have one or more different product attributes and may be provided by multiple different vendors. In such instances, it may be difficult for vendors or vendor managers to determine the performance of a particular product in the marketplace as compared to other similar products in the product catalog. Further, it may be challenging to determine a root cause of undesirable performance of a particular product and whether modifications to one or more attributes of the product may lead to improved product performance. Determining relative product performance of similar products offered for sale in a marketplace may allow vendors and vendor managers to more accurately assess the performance of a particular product and to effectively address a root cause of undesirable performance.

BRIEF DESCRIPTION OF THE DRAWINGS

FIG. 1E is a graph illustrating determining an expected product cost and a relative product cost for a particular product of a product catalog in accordance with one or more embodiments of the disclosure.

FIG. 1F is a graph illustrating determining an expected inbound cost and a relative inbound cost for a particular product of a product catalog in accordance with one or more embodiments of the disclosure.

FIG. 1G is a graph illustrating determining an expected shipping cost and a relative shipping cost for a particular product of a product catalog in accordance with one or more embodiments of the disclosure.

FIG. 1H is a graph illustrating determining an expected storage cost and a relative storage cost for a particular product of a product catalog in accordance with one or more embodiments of the disclosure.

FIG. 1I is a graph illustrating determining an expected processing cost and a relative processing cost for a particular product of a product catalog in accordance with one or more embodiments of the disclosure.

Figure 1A:
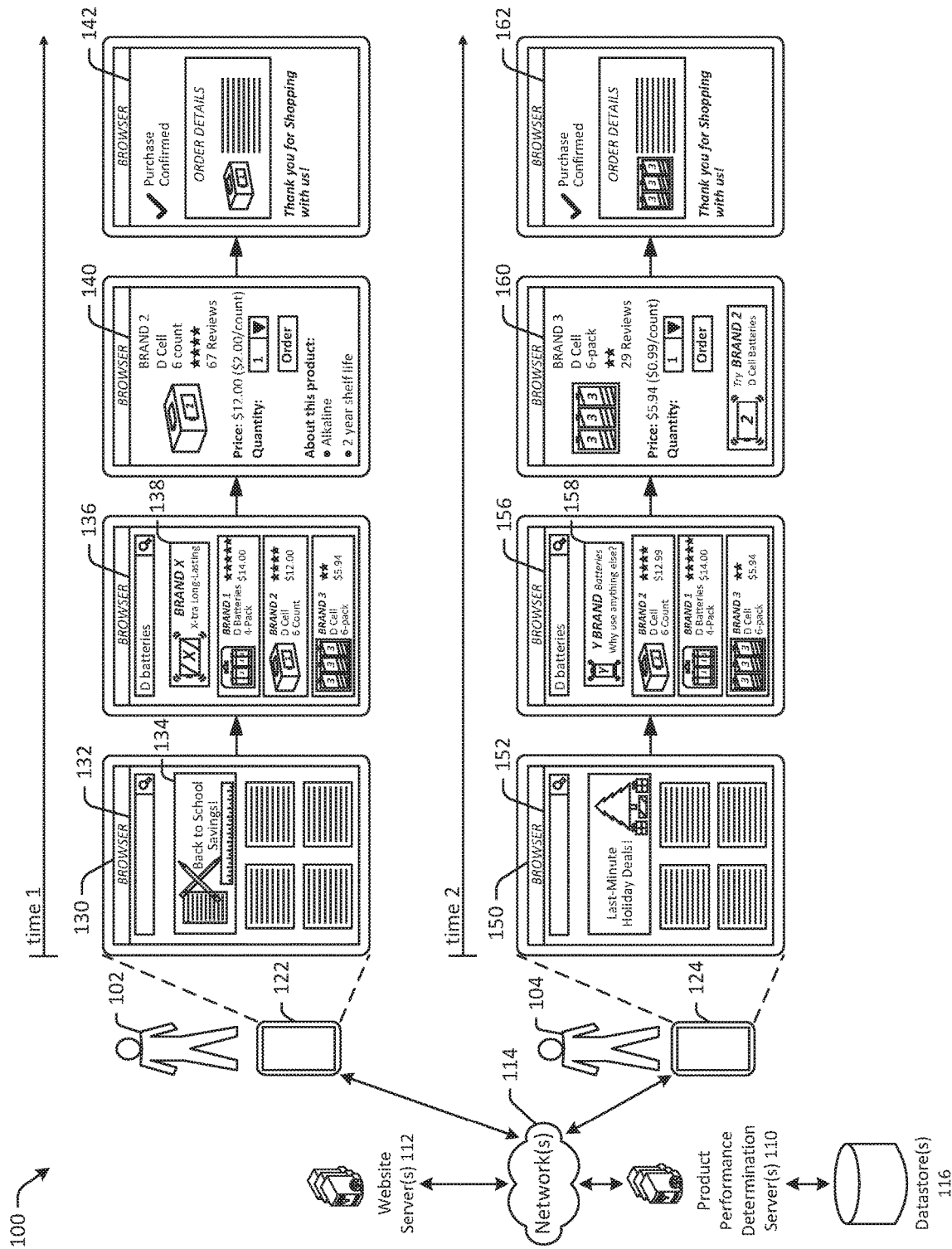
FIG. 1A is a hybrid system and user interface diagram illustrating dynamically determining relative product performance using quantitative values in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Online marketplaces are frequently used to browse and purchase various products offered for sale at a webpage or in an application. For example, digital content related to products available for sale may be presented at electronic devices, such that users may browse the digital content and interact with the content to purchase such products from the retailer operating the marketplace. Although some marketplaces may have a narrow product offering with minimal overlap in the products offered for sale, other marketplaces may have a broad product catalog including a significant number of products that have similar attributes and compete with one another. In some instances, a broad product catalog of an online retailer may include numerous products of the same product type, which may be provided by multiple different vendors. As one example, an online retailer may offer batteries provided by several different vendors, and even within a particular size or battery type, the retailer's product catalog may include multiple competing products. Although similar products offered for sale by an online marketplace generally may be expected to perform in a similar manner due to their common attributes, the differences between similar products may result in substantial performance differences. Further, in some instances, the performance of a particular product over a time period may appear desirable when viewed in isolation, yet such performance may be unfavorable when viewed in light of the performance of other products having one or more similar product attributes.

In the context of an online marketplace having a broad product catalog, the various products offered for sale may be supplied by numerous vendors. Although each vendor may have detailed information regarding the performance of its own products over a particular time period, the vendor generally may be unaware of details regarding the performance of other similar products supplied by different vendors over the same period of time. As a result, the given vendor may believe that one of its products performed well over the time period, while, in reality, the observed performance was less than desirable when compared to that of other similar products. The online retailer generally may include one or more vendor managers who interface with the vendors supplying products sold by the retailer. Such vendor managers may provide feedback to a vendor with respect to the performance of a particular product provided by the vendor and/or potential changes that could be implemented by the vendor in an effort to improve performance of the product. However, such feedback often may be the result of a "gut feeling" or educated guess based on the vendor manager's experience in the industry and/or knowledge of similar scenarios. In view of the number of variables involved in accurately assessing the performance of a particular product in view of similar competing products and the fact such variables may change regularly over time, vendor managers generally may be unable to effectively compare the performance of similar products within a product catalog or identify a root cause of undesirable performance of a particular product with a desired degree of certainty. As a result, a vendor may modify attributes of a particular product in a manner that has an adverse effect on the product's performance relative to that of similar products or may maintain the attributes of a particular product over a period of time while similar products supplied by other vendors are modified to have improved performance.

In order to optimize usage or expenditure of resources allocated towards supplying numerous products and offering such products for sale via an online marketplace, vendors and/or vendor managers may desire to effectively determine the performance of a particular product in the marketplace as compared to other similar products in the product catalog. However, such determination may be difficult in view of the number of similar products offered for sale, the number of product attributes which may affect the performance of a particular product or products similar thereto, and/or variable nature of the product attributes over time. Additionally, vendors and/or vendor managers may desire to identify a root cause of undesirable performance of a particular product and determine whether certain modifications to one or more attributes of the product may lead to improved product performance.

Embodiments of the disclosure may provide improved accuracy in determining the performance of a particular product in a product catalog of a retailer as compared to the performance of similar products offered for sale by the retailer. Certain embodiments may determine a number of products of a product catalog, which have one or more product attributes in common. For example, it may be determined that a product catalog includes a first product and a second product, and that a first product attribute of a first set of product attributes for the first product is the same as a second product attribute of a second set of product attributes for the second product or a difference between the first product attribute and the second product attribute is less than a predetermined value. Some embodiments may determine a first set of actual performance values for the first product during a first time period. For example, a first set of orders for the first product during the first time period may be used to determine the first set of actual performance values which may be used to calculate a first average actual performance value for the first product over the first time period. In a similar manner, some embodiments may determine a second set of actual performance values for the second product during the first time period. For example, a second set of orders for the second product during the first time period may be used to determine the second set of actual performance values which may be used to calculate a second average actual performance value for the second product over the first time period.

Certain embodiments may generate a first expected performance model using the first set of product attributes, the second set of product attributes, the first set of actual performance values, and the second set of actual performance values. For example, statistical regression techniques may be used to train a mathematical model for determining expected performance values for the first product, the second product, and other similar products of the product catalog. Some embodiments may determine respective expected performance values for the first product and the second product using the expected performance model. For example, the expected performance model and the first set of attributes may be used to determine a first expected performance value for the first product, and the expected performance model and the second set of attributes may be used to determine a second expected performance value for the second product. Some embodiments may determine respective average actual performance values for the first product and the second product over the first time period using the respective sets of actual performance values. For example, the first set of actual performance values may be used to calculate a first average actual performance value for the first product, and the second set of actual performance values may be used to calculate a second average actual performance value for the second product. Certain embodiments may determine respective relative performance values for the first product and the second product using the average actual performance values and the expected performance values. For example, the first average actual performance value and the first expected performance value may be used to calculate a first relative performance value for the first product, and the second average actual performance value and the second expected performance value may be used to calculate a second relative performance value for the second product. The process of determining products of the product catalog, determining respective sets of actual performance values for the products during a time period, generating an expected performance model using respective sets of product attributes and the respective sets of actual performance values, determining respective expected performance values for the products using the expected performance model and the respective sets of product attributes, determining respective average actual performance values for the products using the respective sets of actual performance values, and determining respective relative performance values for the products using the respective average actual performance values and the respective expected performance values may be carried out with respect to any number of products of the product catalog and/or with respect to any time period for which actual performance values are available. Further, any number of expected performance models may be generated, updated, and refined over time as additional actual performance values become available. For example, the expected performance models may be periodically updated, such as on an hourly, daily, or weekly basis. In this manner, accuracy of the expected performance values and the relative performance values may continue to improve over time as additional data becomes available, and the expected performance models may accommodate changes in attributes of the products.

As a result, embodiments of the disclosure may provide improved accuracy in determining the relative performance of a particular product in a product catalog of a retailer as compared to the performance of similar products offered for sale by the retailer. Such relative performance data may allow vendors and/or vendor managers to optimize usage or expenditure of resources allocated towards supplying products and offering such products for sale via the marketplace. In particular, relative performance data may be obtained even when numerous similar products are offered for sale, various product attributes affect the performance of the products, and/or the product attributes are modified over time. Additionally, embodiments of the disclosure may allow vendors and/or vendor managers to identify a root cause of undesirable performance of a particular product and determine whether certain modifications to one or more attributes of the product may lead to improved product performance in view of the expected performance of similar products. It will be appreciated that accurately determining the relative performance of products in a product catalog may be advantageous not only for vendors and vendor managers but also financial controllers, business executives, and other members of the retail business in analyzing the performance of particular products in the catalog. Although certain embodiments of the disclosure may be described in the context of an online retailer, it will be understood that the systems and methods described herein may implemented with respect to traditional brick-and-mortar retailers to provide similar benefits.

This disclosure relates to, among other things, systems, methods, computer-readable media, techniques, and methodologies for dynamically determining relative product performance using quantitative values, which may include one or more machine learning models, predictive algorithms, and the like. Embodiments may determine a number of products of a product catalog. The products may have one or more product attributes in common. Embodiments may determine respective sets of actual performance values for the products during a time period. Embodiments may generate one or more expected performance models using the respective sets of product attributes and the respective sets of actual performance values. Embodiments may determine respective expected performance values for the products using the one or more expected performance models and the respective sets of product attributes. Embodiments may determine respective average actual performance values for the products over the time period using the respective sets of actual performance values. Embodiments may determine respective relative performance values for the products using the respective average actual performance values and the respective expected performance values. The one or more expected performance models may be updated, periodically or continuously, to account for changes to product attributes of the products, one or more products being added to the product catalog, and/or one or more products being removed from the product catalog.

Figure 1B:
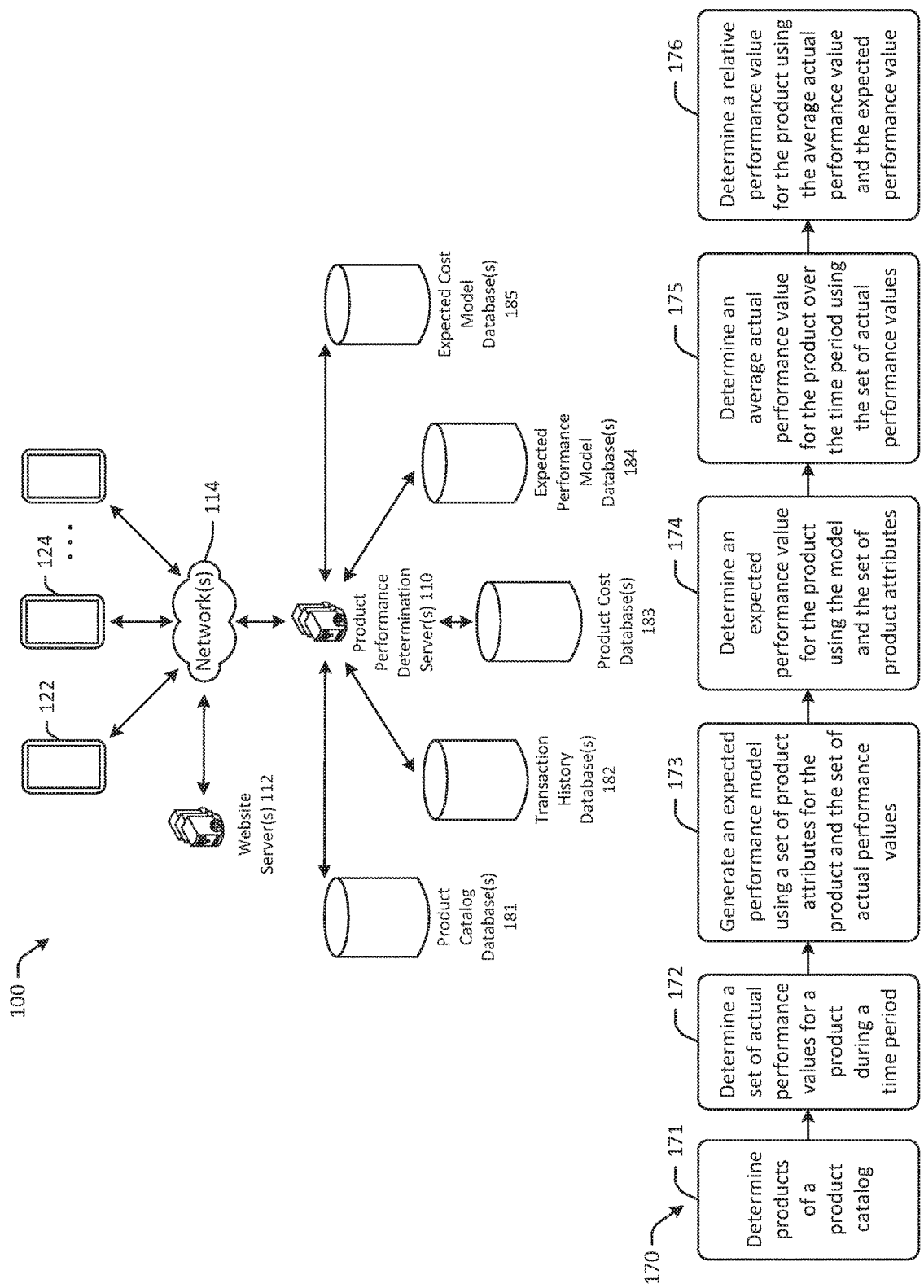
FIG. 1B is a hybrid system and process diagram illustrating dynamically determining relative product performance using quantitative values in accordance with one or more embodiments of the disclosure.

Referring to FIGS. 1A and 1B, an example system 100 illustrating dynamically determining relative product performance using quantitative values is depicted. The system 100 may include one or more servers and at least one or a plurality of user devices that connects to the server. In the example of FIGS. 1A and 1B, one or more product performance determination servers 110 may be in communication with one or more user devices. Communication between the product performance determination server 110 and the one or more user devices may be facilitated by one or more networks. The one or more user devices may connect to or communicate with the product performance determination server 110, on a regular or irregular basis, to receive content from or deliver content to the product performance determination server 110. In the example of FIGS. 1A and 1B, one or more website servers 112 also may be in communication with product performance determination server 110 and the one or more user devices. Communication between the website server 112 and the product performance determination server 110 may be facilitated by one or more networks. The one or more user devices may connect to or communicate with the web site server 112, on a regular or irregular basis, to receive content from or deliver content to the website server 112. The one or more user devices may be any type of electronic device used by a user to communicate with the product performance determination server 110 and the website server 112. The one or more user devices may communicate with the web site server 112 to access one or more web sites, such as by executing a web browser on the user device.

In the example of FIGS. 1A and 1B, the web site server 112 and the product performance determination server 110 may be in communication with a first user device 122 associated with a first user 102, and a second user device 124 associated with a second user 104. Communication between the web site server 112, the product performance determination server 110, and the user devices 122, 124 may be facilitated by one or more network(s) 114. The website server 112 and the product performance determination server 110 may be in communication with and deliver content to or receive content from any number of user devices. The product performance determination server 110 may use one or more expected product performance models to determine expected performance of products offered for sale by a retail website managed by the website server 112. In other words, the product performance determination server 110 may determine expected performance of products in a product catalog of an online marketplace. The product performance determination server 110 may be in communication with one or more datastore(s) 116, which may store product catalog information, transaction history information, product cost information, one or more expected performance models, one or more expected cost models, and other information accessible to the product performance determination server 110.

The first user device 122 may connect to the one or more networks 114 and receive digital content for presentation at the first user device 122. For example, the first user device 122 may communicate with the website server 112 to access a website, such as a retail website, by executing a web browser on the first user device 122. In the example of FIG. 1A, the first user 102 may access a first webpage 132 of a retail website, and digital content may be presented at the first user device 122. The first webpage 132 may be a home page of the retail website. The digital content may be any suitable content, such as text, images, videos, audio, interactive content, and other content related to products offered for sale by the retail website. In some instances, the content may include multiple pieces of content for presentation at respective content delivery slots at the first webpage 132.

Certain content impressions may be positioned within a visible area of a browser window 130 of the first user device 122, while other content impressions may be positioned outside of the visible area of the browser window 130 absent the first user 102 scrolling through the first webpage 132. The digital content presented at the first webpage 132 may include first content of a content campaign related to one or more products or services. In the example of FIG. 1A, the digital content presented at the first webpage 132 may include first content 134 of a first content campaign related a category of products offered for sale, such as products for use in a school setting. The content presented at the first webpage 132 also may include a search bar that allows a user to search the product catalog of the retail website. In the example of FIG. 1A, the first user 102 may use the search bar to search for products related to the product type "batteries," and in particular the specific product type of "D batteries."

In the example of FIG. 1A, the first user 102 may subsequently access a second webpage 136 of the website, and digital content may be presented at the first user device 122. The digital content presented at the second webpage 136, which may be a product search page of the retail website, may include various pieces of content of one or more content campaigns related to one or more products or services. In the example of FIG. 1A, the digital content presented at the second webpage 136 may include second content 138 of a second content campaign related to a particular brand of batteries. The second content 138 may include an image and textual product related information promoting the brand of batteries. For example, the product related information may include the brand name of the batteries (e.g., "BRAND X") and a feature of the batteries (e.g., "X-tra Long Lasting"). The digital content presented at the second webpage 136 also may include multiple pieces of content related to products in the product catalog which satisfy the search terms provided by the first user 102, "D batteries." In the example of FIG. 1A, multiple pieces of content related to respective products matching the search criteria may be presented at the second webpage 136. The first user 102 may select one of the pieces of content to receive additional information related to the respective product. In the example of FIG. 1A, the first user 102 may select the content related to the product "BRAND 2 D Cell 6 Count."

In the example of FIG. 1A, the first user 102 may subsequently access a third webpage 140 of the website, and digital content may be presented at the first user device 122. The digital content presented at the third webpage 140, which may be a product detail page of the retail website, may include various pieces of content related to the "BRAND 2 D Cell 6 Count" product. The content presented at the third webpage 140 may include various types of product related information and a selectable item to facilitate ordering of the product. In the example of FIG. 1A, the first user 102 may select the selectable item to order the "BRAND 2 D Cell 6 Count" product. The first user 102 may then access a fourth webpage 142 of the retail website, which may be an order confirmation page indicating that the order for the "BRAND 2 D Cell 6 Count" product has been completed.

In a similar manner, the second user device 124 may connect to the one or more networks 114 and receive digital content for presentation at the second user device 124. For example, the second user device 124 may communicate with the web site server 112 to access the retail website by executing a web browser on the second user device 124. In the example of FIG. 1A, the second user 104 may access a fifth webpage 152 of the retail website, and digital content may be presented at the second user device 124. The fifth webpage 152 may be the home page of the retail website. The digital content may be any suitable content, such as text, images, videos, audio, interactive content, and other content related to products offered for sale by the retail website. In some instances, the content may include multiple pieces of content for presentation at respective content delivery slots at the first webpage 132. Certain content impressions may be positioned within a visible area of a browser window 150 of the second user device 124, while other content impressions may be positioned outside of the visible area of the browser window 150 absent the second user 104 scrolling through the fifth webpage 152. The digital content presented at the fifth webpage 152 may include a search bar that allows a user to search the product catalog of the retail website. In the example of FIG. 1A, the second user 104 may use the search bar to search for products related to the product type "batteries," and in particular the specific product type of "D batteries."

In the example of FIG. 1A, the second user 104 may subsequently access a sixth webpage 156 of the website, and digital content may be presented at the second user device 124. The digital content presented at the sixth webpage 156, which may be a product search page of the retail website, may include various pieces of content of one or more content campaigns related to one or more products or services. In the example of FIG. 1A, the digital content presented at the sixth webpage 156 may include third content 158 of a third content campaign related to a particular brand of batteries. The third content 158 may include an image and textual product related information promoting the brand of batteries. For example, the product related information may include the brand name of the batteries (e.g., "Y BRAND"), the product type (e.g., "Batteries"), and a product slogan (e.g., "Why use anything else?"). The digital content presented at the sixth webpage 156 also may include multiple pieces of content related to products in the product catalog which satisfy the search terms provided by the second user 104, "D batteries." In the example of FIG. 1A, multiple pieces of content related to respective products matching the search criteria may be presented at the sixth webpage 156. The second user 104 may select one of the pieces of content to receive additional information related to the respective product. In the example of FIG. 1A, the second user 104 may select the content related to the product "BRAND 3 D Cell 6-pack."

In the example of FIG. 1A, the second user 104 may subsequently access a seventh webpage 160 of the website, and digital content may be presented at the second user device 124. The digital content presented at the seventh webpage 160, which may be a product detail page of the retail website, may include various pieces of content related to the "BRAND 3 D Cell 6-pack" product. The content presented at the seventh webpage 160 may include various types of product related information and a selectable item to facilitate ordering of the product. In the example of FIG. 1A, the second user 104 may select the selectable item to order the "BRAND 3 D Cell 6-pack" product. The second user 104 may then access an eighth webpage 162 of the retail website, which may be an order confirmation page indicating that the order for the "BRAND 3 D Cell 6-pack" product has been completed.

Each product of the product catalog for the retail website may have a set of product attributes or features related to the product offered for sale. The set of attributes may include two, three, four, five, or any number of product attributes related to the product. In some instances, the set of product attributes may include a product type, a brand, a weight value indicating a weight of the product, one or more dimensional values indicating one or more dimensions of the product, and a product value of the product. For example, the "BRAND 2 D Cell 6 Count" product may have a set of product attributes that includes a product type (e.g., "battery"), a brand (e.g., "BRAND 2"), a weight value (e.g., "1 pound"), dimensional values (e.g., "2×2×4 inches"), and a product value (e.g., "$12.00"). The set of product attributes may include additional or alternative attributes of the product offered for sale.

To determine the relative performance of a particular product of the product catalog of the retail website, the product performance determination server 110 may execute one or more process flows. For example, an example process flow 170 for dynamically determining relative product performance using quantitative values is depicted in FIG. 1B.

At block 171 of the process flow 170, the product performance determination server 110 may determine products of the product catalog of the retail website. The product catalog may include any number of products offered for sale by the retail website. For example, the product catalog may include a first product, a second product, and multiple additional products offered for sale by the retail website. Each product of the product catalog for the retail website may have a set of product attributes or features related to the product offered for sale. In some embodiments, the product performance determination server 110 may determine the products of the product catalog using one or more product catalog database(s) 181 accessible to the product performance determination server 110. The product catalog database 181 may store product catalog information related to the products in the product catalog of the retail website. For example, one or more mapping tables may be stored at the product catalog database 181 and accessible to the product performance determination server 110 for use in determining the products of the product catalog. The mapping table may include respective lists of unique product identifiers and the corresponding sets of product attributes for all of the products in the product catalog. In this manner, when a particular product is known, for example by the product's unique product identifier, the mapping table may be used to determine the set of product attributes for the product. In some instances, the unique product identifiers may be identification numbers or other values. In some instances, each set of product attributes may include a product type, a brand, a weight value, one or more dimensional values, and a product value of the respective product.

At block 172 of the process flow 170, the product performance determination server 110 may determine a set of actual performance values for a product of the product catalog during a particular time period. In some instances, the product performance determination server 110 may determine respective sets of actual performance values for all of the products of the product catalog during the time period. In some instances, the product performance determination server 110 may determine respective sets of actual performance values for all of the products of a particular portion of the product catalog during the time period. For example, the product performance determination server 110 may determine respective sets of actual performance values for all of the products of the product catalog having at least one identical or similar product attribute. In some instances, the product performance determination server 110 may determine a first set of actual performance values for the first product during a first time period, and also may determine a second set of actual performance values for the second product during the first time period. In some instances, the product performance determination server 110 may determine respective sets of actual performance values for all of the products during the first time period.

The product performance determination server 110 may determine the respective sets of actual performance values using one or more transaction history database(s) 182 and one or more product cost database(s) 183 accessible to the product performance determination server 110. The transaction history database 182 may store transaction information relating to completed orders for products of the product catalog. For example, the transaction information may include respective transaction entries for every order completed via the retail website. Each transaction entry may include the unique product identifier for the respective product ordered, a timestamp for the order, a product value for the product ordered, an indication that the ordered product was returned or was not returned by the user, and an indication that the ordered product was replaced or was not replaced by the retail website. In this manner, when a particular product is known, for example by the product's unique product identifier, all completed orders for the product may be identified using the transaction information. Further, the product performance determination server 110 may limit completed orders for products to those falling within a particular time period using the order timestamps. In some instances, the product value for the product ordered may be the purchase price paid by the user ordering the product. In other words, the product value may be the sale price paid by the user to the retail website when ordering the product. In some embodiments, the transaction information may be stored in the transaction history database 182 in the form of a mapping table.

The product cost database 183 may include product cost information relating to products of the product catalog. For example, the product cost information may include, for each product of the product catalog, the unique product identifier for the product, a total cost for the product, multiple component costs for the product, and one or more timestamps for any changes made to one of the component costs. In this manner, when a particular product is known, for example by the product's unique product identifier, and a time of a particular order is known, for example by the order timestamp, the total cost and each of the component costs for the ordered product may be identified using the product cost information. The total cost for the ordered product may be a sum of the component costs for the ordered product. In some instances, the component costs may include a product cost, an inbound cost, a shipping cost, a storage cost, and a processing cost for the ordered product. The product cost may be the cost incurred by the retail website to obtain the product from the respective vendor. The inbound cost may be the cost incurred by the retail website to have the product delivered to the retail website. The shipping cost may be the cost incurred by the retail website to have the product delivered to the user. The storage cost may be the cost incurred by the retail website to store the product after receiving the product from the vendor and before delivering the product to the user. The processing cost may be the cost incurred by the retail web site in handling a return of the product or a replacement of the product. In some embodiments, a sum of the product cost, the inbound cost, and the shipping cost for the ordered product may be referred to as the cost of goods sold (COGS). In some embodiments, a sum of the storage cost and the processing cost for the ordered product may be referred to as the operational expenses. In some embodiments, the product cost information may be stored in the product cost database 183 in the form of a mapping table.

The product performance determination server 110 may determine an actual performance value for each order of a particular product completed during a particular time period using the transaction information and the product cost information. The product performance determination server 110 may use the transaction information to identify a set of orders for the particular product during the particular time period. For example, the product performance determination server 110 may use the unique product identifier for the product and the respective order timestamps stored in the transaction history database 182 to determine all completed orders for the product that occurred within the time period. In other words, the unique product identifier for the product and the respective order timestamps may be used to identify the set of orders for the product which occurred within the time period. The product performance determination server 110 may use the product cost information to determine the total cost for each order of the set of orders for the product. For example, the product performance determination server 110 may use the unique product identifier for the product and the respective cost change timestamps stored in the product cost database 182 to determine the total cost for each order of the set of orders. For each order, the product performance determination server 110 may determine an actual performance value for the product using the product value for the ordered product and the total cost for the ordered product. In other words, the actual performance value for the product may be determined based at least in part on the product value for the ordered product and the total cost for the ordered product. In some instances, the actual performance value for the product may be a difference between the product value for the ordered product and the total cost for the ordered product. For example, the actual performance value for the product may be determined by subtracting the total cost for the ordered product from the product value for the ordered product. In some instances, the product value for the ordered product may be the purchase price paid by the user ordering the product, and the actual performance value may be the profit received by (or the loss incurred by) the retail website for the completed order.

At block 173 of the process flow 170, the product performance determination server 110 may generate an expected performance model for determining respective expected performance values for the products of the product catalog. The product performance determination server 110 may generate the expected performance model using the respective sets of product attributes and the respective sets of actual performance values for multiple or all of the products of the product catalog. In other words, the expected performance model may be generated based at least in part on the respective sets of product attributes and the respective sets of actual performance values for multiple or all of the products of the product catalog. In some instances, the product performance determination server 110 may use statistical regression techniques to generate the expected performance model. In other words, statistical regression techniques may be used to fit the expected performance model to a data set including the respective sets of product attributes and the respective sets of actual performance values for multiple or all of the products of the product catalog.

Figure 1D:
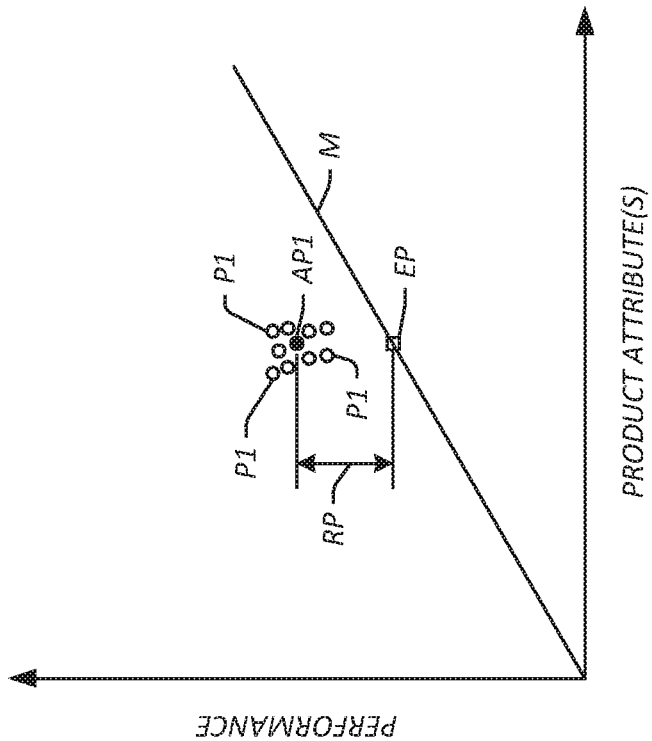
FIG. 1D is a graph illustrating determining an expected performance value and a relative performance value for a particular product of a product catalog in accordance with one or more embodiments of the disclosure.
Figure 1C:
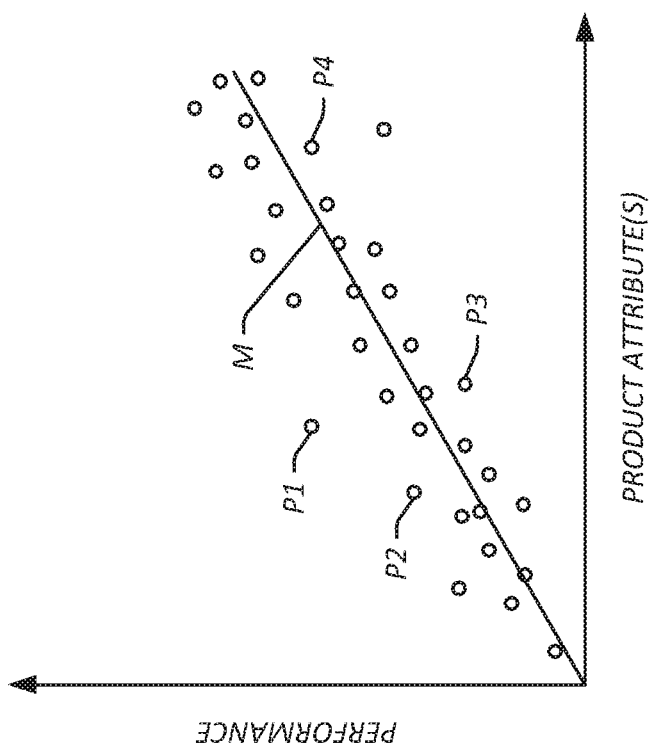
FIG. 1C is a graph illustrating generating an expected product performance model using product attributes of similar products of a product catalog in accordance with one or more embodiments of the disclosure.

FIG. 1C illustrates generating an expected performance model for determining respective expected performance values for the products of the product catalog in accordance with one or more embodiments of the disclosure. According to the example of FIG. 1C, the data set includes multiple data points P, with each data point P representing a particular order for one of the products of the product catalog. The expected performance model may be generated using the respective sets of product attributes and the respective actual performance values for multiple or all of the products of the product catalog. For example, a first data point P1 may represent an order for a first product, a second data point P2 may represent an order for a second product, a third data point P3 may represent an order for a third product, and a fourth data point P4 may represent an order for a fourth product of the product catalog. The expected performance model may be generated using any number or orders for any number of products of the product catalog. Statistical regression techniques may be used to fit an expected performance model M to the set of data points P. In some instances, the expected performance model M may exhibit a linear trend. In other instances, the expected performance model M may exhibit a non-linear trend, such as a logarithmic trend. In some embodiments, multiple product attributes of each set of product attributes may be used to generate the expected performance model M. In some embodiments, all of the product attributes of each set of product attributes may be used to generate the expected performance model M In some embodiments, a single product attribute of each set of product attributes may be used to generate the expected performance model M.

At block 174 of the process flow 170, the product performance determination server 110 may determine an expected performance value for a particular product of the product catalog. In some instances, the product performance determination server 110 may determine respective expected performance values for all of the products of the product catalog. The product performance determination server 110 may determine an expected performance value for a particular product using the expected performance model and the set of product attributes for the particular product. In other words, the expected performance value for the particular product may be determined based at least in part on the expected performance model and the set of product attributes for the particular product. For example, the expected performance value for the particular product may be determined by using the corresponding product attributes for the particular product (i.e., the one or multiple or all of the product attributes for the particular product which correspond to the one or multiple or all of the product attributes used to generate the expected performance model) as the input for the expected performance model. In this manner, the expected performance model may output the expected performance value for the particular product.

At block 175 of the process flow 170, the product performance determination server 110 may determine an average actual performance value for a particular product of the product catalog over the particular time period. In some instances, the product performance determination server 110 may determine respective average actual performance values for all of the products of the product catalog over the particular time period. The product performance determination server 110 may determine an average actual performance value for a particular product over a particular time period using the set of actual performance values for the set of orders for the particular product during the particular time period. In other words, the average actual performance value for the particular product over the particular time period may be determined based at least in part on the set of actual performance values for the set of orders for the product during the particular time period. For example, the average actual performance value for the particular product may be calculated as a sum of the actual performance values for the set of orders for the product during the time period divided by the number of orders of the set of orders during the time period.

At block 176 of the process flow 170, the product performance determination server 110 may determine a relative performance value for a particular product of the product catalog. In some instances, the product performance determination server 110 may determine respective relative performance values for all of the products of the product catalog. The product performance determination server 110 may determine a relative performance value for a particular product using the average actual performance value and the expected performance value for the particular product. In other words, the relative performance value for the particular product may be determined based at least in part on the average actual performance value and the expected performance value for the particular product. In some instances, the relative performance value for the particular product may be calculated as a difference between the average actual performance value and the expected performance value for the particular product. For example, the relative performance value for the particular product may be determined by subtracting the expected performance value from the average actual performance value for the particular product or subtracting the average actual performance value from the expected performance value for the particular product.

FIG. 1D illustrates determining an expected performance value and a relative performance value for a particular product of the product catalog in accordance with one or more embodiments of the disclosure. According to the example of FIG. 1D, the data set includes multiple data points P, with each open round data point P representing a particular order for the particular product of the product catalog. For example, each open round data point P1 may represent an order for a first product. The solid round data point AP1 represents the average actual performance value for the particular product. In other words, for the illustrated example, the solid round data point AP1 may represent the average actual performance value for the first product, calculated using the respective actual performance values for the set of orders for the first product. As described above, the expected performance value for the particular product may be determined by using the corresponding product attributes for the particular product as the input for the expected performance model M, which may output the expected performance value for the particular product. According to the example of FIG. 1D, the expected performance value for the particular product may be the point along the expected performance model M in the direction of the Product Attribute(s) axis which corresponds to the position of the average actual performance value data point AP1 for the particular product in the direction of the Product Attribute(s) axis. The open square data point EP represents the expected performance value for the particular product. For example, the open square data point EP may represent the expected performance value for the first product. According to the example of FIG. 1D, the relative performance value RP for the particular product may be the distance between the average actual performance value data point AP1 and the expected performance value data point EP in the direction of the Performance axis. In other words, the relative performance value RP for the particular product may be the difference between the average actual performance value and the expected performance value for the particular product. For example, the difference between the average actual performance value data point AP1 and the expected performance value data point EP may represent the relative performance value RP for the first product.

For a particular product of the product catalog, the average actual performance value and the expected performance value for the product may be used to determine whether the particular product has over-performed or under-performed with respect to the expected performance value. The particular product may be deemed to have over-performed with respect to the expected performance value when the average actual performance value is greater than the expected performance value. For example, as shown in FIG. 1D, the average actual performance value for the first product may be greater than the expected performance value for the first product, and thus the first product may be deemed to have over-performed with respect to performance expectations. In contrast, the particular product may be deemed to have under-performed with respect to the expected performance value when the average actual performance value is less than the expected performance value.

For a particular product of the product catalog, the relative performance value for the product may be used to determine an extent to which the particular product has over-performed or under-performed with respect to the expected performance value. In some instances, the relative performance value for the product may be compared to a threshold relative performance value range. For example, the product performance determination server 110 may determine whether the relative performance value for the product is within a threshold relative performance value range or outside of the threshold relative performance value range. In some instances, the threshold relative performance value range may extend from a first threshold limit at the expected performance value data point EP to a second threshold limit above the expected performance value data point EP in the direction of the Performance axis. In some instances, the threshold relative performance value range may extend from a first threshold limit below the expected performance value data point EP to a second threshold limit above the expected performance value data point EP in the direction of the Performance axis. In some instances, the threshold relative performance value range may extend from a first threshold limit below the expected performance value data point EP to a second threshold limit at the expected performance value data point EP in the direction of the Performance axis.

In some embodiments, a determination that the relative performance value for the particular product is outside of the threshold relative performance value range may result in further action by the product performance determination server 110. For example, the product performance determination server 110 may analyze the component costs for the particular product based at least in part on the determination that the relative performance value for the product is outside of the threshold relative performance value range. In some instances, based at least in part on the determination that the relative performance value for the product is outside of the threshold relative performance value range, the product performance determination server 110 may analyze the component costs for orders for the particular product to determine one or more root causes of the undesired product performance. As explained above, the component costs for an ordered product may include a product cost, an inbound cost, a shipping cost, a storage cost, and a processing cost for the ordered product.

For each component cost, the product performance determination server 110 may determine a set of actual component cost values for the component cost for a set of orders for the product during a time period. In some instances, the time period during which the set of actual component cost values is determined is the same time period during which the set of actual performance values was determined. In some embodiments, the set of actual component cost values for the component cost may be determined using the product cost information stored at the product cost database(s) 183.

For each component cost, the product performance determination server 110 may generate an expected component cost model. In some instances, the expected component cost model may be generated in a manner similar to that used to generate the expected performance model described above. For example, the expected component cost model may be generated based at least in part on the set of product attributes for the particular product and the set of actual component cost values.

For each component cost, the product performance determination server 110 may determine an expected component cost value for the component cost. In some instances, the expected component cost value may be generated in a manner similar to that used to generate the expected performance value described above. For example, the expected component cost value may be determined based at least in part on the expected component cost model and the set of product attributes for the particular product.

For each component cost, the product performance determination server 110 may determine an average actual component cost value for the component cost over the time period. In some instances, the average actual component cost value may be determined in a manner similar to that used to determine the average actual performance value described above. For example, the average actual component cost value over the time period may be determined based at least in part on the set of actual component cost values for the orders for the product during the time period.

For each component cost, the product performance determination server 110 may determine a relative component cost value for the component cost. In some instances, the relative component cost value may be generated in a manner similar to that used to generate the relative performance value described above. For example, the relative component cost value may be determined based at least in part on the average actual component cost value and the expected component cost value. In some embodiments, the relative component cost value may be calculated as a difference between the average actual component cost value and the expected component cost value.

For each component cost, the relative component cost value may be used to determine an extent to which the component cost has contributed to the over-performance or under-performance of the particular product with respect to the expected performance value. In some instances, the relative component cost value may be compared to a threshold relative component cost value range. For example, product performance determination server 110 may determine whether the relative component cost value for the product is within a threshold relative component cost value range or outside of the threshold relative component cost value range. In some embodiments, a particular component cost may be determined to be a root cause of the over-performance or under-performance of the particular product with respect to the expected performance value when the component cost is outside of the threshold relative component cost value range.

FIGS. 1E-1I illustrate determining respective expected component cost values and respective relative component cost values for different component costs for a particular product in accordance with one or more embodiments of the disclosure. As explained above, the component costs for an ordered product may include a product cost, an inbound cost, a shipping cost, a storage cost, and a processing cost for the ordered product. According to the example of FIG. 1E, solid round data point APRC represents the average actual product cost value for the product cost for a set of orders for the particular product over a time period, model MPRC represents the expected component cost model generated based at least in part on the set of product attributes for the particular product and the set of actual product cost values, open square data point EPRC represents the expected product cost value for the product cost, and distance RPRC represents the relative product cost value for the product cost. According to the illustrated example, the average actual product cost value is greater than the expected product cost value, and thus the product cost may be a contributing cause of under-performance of the particular product. In some instances, the product cost may be a root cause of under-performance of the particular product, depending on the limits of the threshold relative product cost value range.

According to the example of FIG. 1F, solid round data point AIC represents the average actual inbound cost value for the product cost for a set of orders for the particular product over a time period, model MIC represents the expected inbound cost model generated based at least in part on the set of product attributes for the particular product and the set of actual inbound cost values, open square data point EIC represents the expected inbound cost value for the inbound cost, and distance RIC represents the relative inbound cost value for the inbound cost. According to the illustrated example, the average actual inbound cost value is greater than the expected inbound cost value, and thus the inbound cost may be a contributing cause of under-performance of the particular product. In some instances, the inbound cost may be a root cause of under-performance of the particular product, depending on the limits of the threshold relative inbound cost value range.

According to the example of FIG. 1G, solid round data point ASHC represents the average actual shipping cost value for the shipping cost for a set of orders for the particular product over a time period, model MSHC represents the expected shipping cost model generated based at least in part on the set of product attributes for the particular product and the set of actual shipping cost values, open square data point ESHC represents the expected shipping cost value for the shipping cost, and distance RSHC represents the relative shipping cost value for the shipping cost. According to the illustrated example, the average actual shipping cost value is greater than the expected shipping cost value, and thus the shipping cost may be a contributing cause of under-performance of the particular product. In some instances, the shipping cost may be a root cause of under-performance of the particular product, depending on the limits of the threshold relative shipping cost value range.

According to the example of FIG. 1H, solid round data point ASTC represents the average actual storage cost value for the storage cost for a set of orders for the particular product over a time period, model MSTC represents the expected storage cost model generated based at least in part on the set of product attributes for the particular product and the set of actual storage cost values, open square data point ESTC represents the expected storage cost value for the storage cost, and distance RSTC represents the relative storage cost value for the storage cost. According to the illustrated example, the average actual storage cost value is less than the expected storage cost value, and thus the storage cost may offset the effect of other component costs that may contribute to under-performance of the particular product.

According to the example of FIG. 1I, solid round data point APCC represents the average actual processing cost value for the processing cost for a set of orders for the particular product over a time period, model MPCC represents the expected processing cost model generated based at least in part on the set of product attributes for the particular product and the set of actual processing cost values, open square data point EPCC represents the expected processing cost value for the processing cost, and distance RPCC represents the relative processing cost value for the processing cost. According to the illustrated example, the average actual processing cost value is less than the expected processing cost value, and thus the processing cost may offset the effect of other component costs that may contribute to under-performance of the particular product.

In some embodiments, a determination that the relative performance value for a particular product is within the threshold relative performance value range may result in certain actions taken by the product performance determination server 110 with respect to the particular product. For example, the product performance determination server 110 may, based at least in part on the determination that the relative performance value for a particular product is within the threshold relative performance value range, generate an indication that the vendor supplying the particular product is to receive a promotional discount on a cost for presenting content related to the particular product at a webpage of the retail website. In some instances, the vendor may receive a promotional discount on a cost for presenting content related to the particular product at a content delivery slot of a main page, a product search page, a product detail page, or an order confirmation page of the retail website, such as one of the content delivery slots illustrated in FIG. 1A. In some embodiments, the product performance determination server 110 may automatically generate the indication and cause the indication to be sent to the vendor based at least in part on the determination that the relative performance value for a particular product is within the threshold relative performance value range.

In some embodiments, a determination that the relative performance value for a particular product is outside of the threshold relative performance value range may result in certain actions taken by the product performance determination server 110. For example, the product performance determination server 110 may, based at least in part on the determination that the relative performance value for a particular product is outside of the threshold relative performance value range, generate an indication that a position of content related to the particular product presented at a product search page of the retail website is to be modified (as illustrated in FIG. 1A with respect to the "BRAND 2 D Cell 6 Count" product). In some embodiments, the product performance determination server 110 may automatically generate the indication and cause the indication to be sent to the web site server 112 based at least in part on the determination that the relative performance value for the particular product is outside of the threshold relative performance value range. As another example, the product performance determination server 110 may, based at least in part on the determination that the relative performance value for a particular product is outside of the threshold relative performance value range, generate an indication that content related to a different product of the product catalog is to be presented at a content delivery slot at the product detail page of the retail website for the particular product (as illustrated in FIG. 1A with respect to the "BRAND 3 D Cell 6-pack" product). In some embodiments, the product performance determination server 110 may automatically generate the indication and cause the indication to be sent to the website server 112 based at least in part on the determination that the relative performance value for the particular product is outside of the threshold relative performance value range.

By implementing the process of determining products of a product catalog, determining respective sets of actual performance values for the products during a time period, generating an expected performance model using respective sets of product attributes and the respective sets of actual performance values, determining respective expected performance values for the products using the expected performance model and the respective sets of product attributes, determining respective average actual performance values for the products over the time period using the sets of actual performance values, and determining respective relative performance values for the products using the respective actual performance values and the respective expected performance values, embodiments of the disclosure may allow relative product performance of a particular product of the product catalog to be effectively and accurately determined.

Further, any number of expected performance models may be generated, updated, and refined over time as additional actual performance values become available. For example, the expected performance models may be periodically updated, such as on an hourly, daily, or weekly basis. In this manner, accuracy of the expected performance values and the relative performance values may continue to improve over time as additional data becomes available, and the expected performance models may accommodate changes in attributes of the products.

Figure 1K:
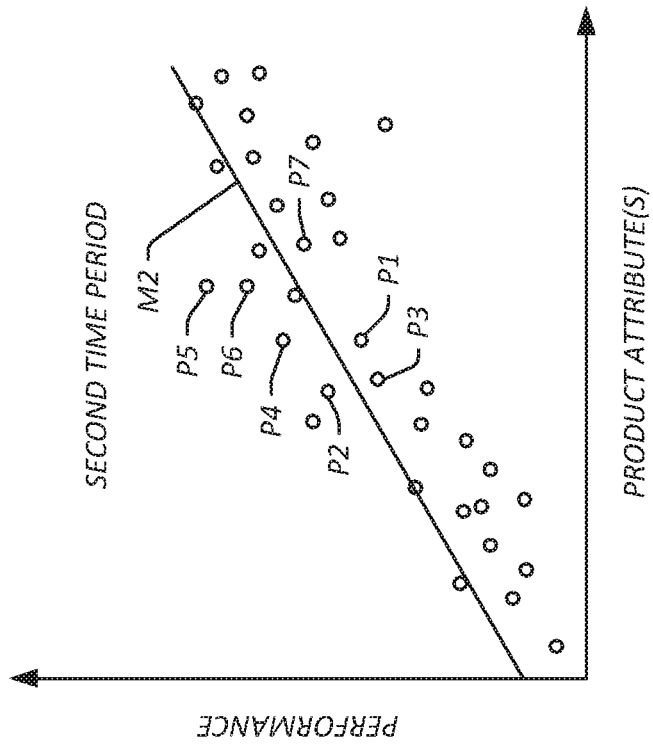
FIG. 1K is a graph illustrating generating an expected product performance model using product attributes of similar products of a product catalog for a second time period in accordance with one or more embodiments of the disclosure.
Figure 1J:
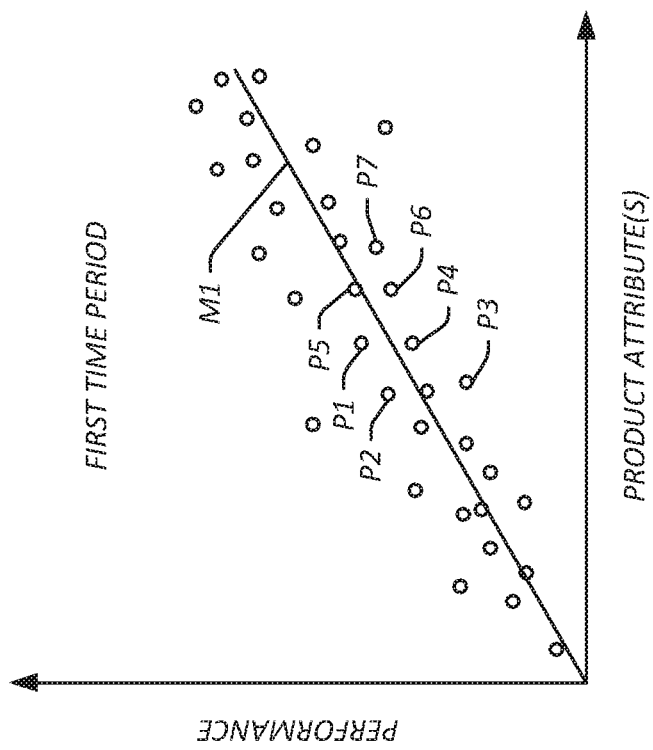
FIG. 1J is a graph illustrating generating an expected product performance model using product attributes of similar products of a product catalog for a first time period in accordance with one or more embodiments of the disclosure.

FIGS. 1J and 1K provide an example of how changes in the performance of one or more products of a product catalog may affect the relative performance of other similar products of the product catalog. Similar to FIG. 1C described above, FIG. 1J illustrates generating an expected performance model for determining respective expected performance values for products of the product catalog using data for product orders during a first time period in accordance with one or more embodiments of the disclosure. According to the example of FIG. 1J, the data set used to generate the expected performance model includes multiple data points P, with each data point P representing a particular order for one of the products of the product catalog. A first data point P1 may represent an order for a first product, a second data point P2 may represent an order for a second product, a third data point P3 may represent an order for a third product, a fourth data point P4 may represent an order for a fourth product, a fifth data point P5 may represent an order for a fifth product, a sixth data point P6 may represent an order for a sixth product, and a seventh data point P7 may represent an order for a seventh product of the product catalog. According to the example, the first product, the second product, the third product, the fourth product, the fifth product, the sixth product, and the seventh product may be similar products. In other words, one or more respective product attributes of the first product, the second product, the third product, the fourth product, the fifth product, the sixth product, and the seventh product may be the same as one another or differences between the respective product attributes may be less than respective predetermined values for the corresponding product attributes. Statistical regression techniques may be used to fit a first expected performance model M1 to the set of data points P. In some instances, the first expected performance model M1 may exhibit a linear trend.

After the first time period, changes affecting the performance of one or more of the products of the product catalog may be made. In some instances, one or more component costs for orders for one of the products may be changed. For example, the product cost for a particular product may be decreased by the retailer renegotiating arrangements for obtaining the product from the respective vendor. As another example, the inbound cost for a particular product may be decreased by the retailer obtaining alternative arrangements for receiving the product from the respective vendor. In some instances, one or more product attributes of one or more of the products may be changed. For example, a dimensional value and/or a weight value for a particular product may be changed due to modifications to packaging of the product. In some instances, a decrease in the dimensional value and/or the weight value for the product may result in a decrease in the inbound cost, the shipping cost, and/or the storage cost for the product. Changes to the component costs for orders for products of the product catalog and/or the product attributes of products of the product catalog may ultimately affect the performance such products over a period of time following implementation of such changes.

FIG. 1K illustrates generating an expected performance model for determining respective expected performance values for products of the product catalog using data for product orders during a second time period after the first time period in accordance with one or more embodiments of the disclosure. According to the example of FIG. 1K, the data set used to generate the expected performance model includes multiple data points P representing orders for the same products of the product catalog used to generate the first expected performance model M1. In this manner, a first data point P1 may represent an order for the first product, a second data point P2 may represent an order for the second product, a third data point P3 may represent an order for the third product, a fourth data point P4 may represent an order for the fourth product, a fifth data point P5 may represent an order for the fifth product, a sixth data point P6 may represent an order for the sixth product, and a seventh data point P7 may represent an order for the seventh product. According to the example, the respective actual performance values for the second product, the third product, the fourth product, the fifth product, the sixth product, and the seventh product have changed for the second time period as compared to the first time period, while the actual performance value for the first product has remained the same for the second time period as compared to the first time period. In particular, the respective actual performance values for the second product, the third product, the fourth product, the fifth product, the sixth product, and the seventh product have increased for the second time period as compared to the first time period. In some instances, such increases in the respective actual performance values may be a result of one or more changes to component costs for orders for the respective products and/or product attributes of the respective products. Statistical regression techniques may be used to fit a second expected performance model M2 to the set of data points P.

According to the example of FIG. 1K, the second expected performance model M2 may be different than the first expected performance model M1. For example, the changes to the respective actual performance values for the second product, the third product, the fourth product, the fifth product, the sixth product, and the seventh product may result in the second expected performance model M2 exhibiting a linear trend that is shifted upwards relative to that of the first expected performance model M1. Accordingly, the respective relative performance values for the products of the product catalog may be different over the second time period as compared to those over the first time period. According to the illustrated example, the actual performance value for the first product was greater than the expected performance value for the first product over the first time period, and thus the first product over-performed with respect to expected performance. However, the actual performance value for the first product was less than the expected performance value for the first product over the second time period, and thus the first product under-performed with respect to expected performance. In this manner, the changes in actual performance for the similar products (the second product, the third product, the fourth product, the fifth product, the sixth product, and the seventh product) from the first time period to the second time period resulted in a change in the relative performance for the first product even though the actual performance for the first product remained the same.

The expected performance model may be updated and the relative performance values for numerous similar products of the product catalog may be determined periodically over a number of subsequent time periods. For each time period, certain products may be identified as under-performing with respect to expected performance values. As described above, one or more component costs for orders for an under-performing product may be determined to be a root cause of the undesirable relative performance of the product. As a result of such determination, changes may be made to decrease one or more of the component costs for orders for the under-performing product, which may increase the actual performance value for the product over a subsequent time period. As described above, such increase in the actual performance value for the product may cause a shift in the expected performance model generated for the subsequent time period. In this manner, the process of periodically updating the expected performance model and determining the relative performance values for numerous similar products of the product catalog may drive a cycle of continuous improvement, motivating improvements in actual performance for a particular product as a result of actual performance improvements for other similar products.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
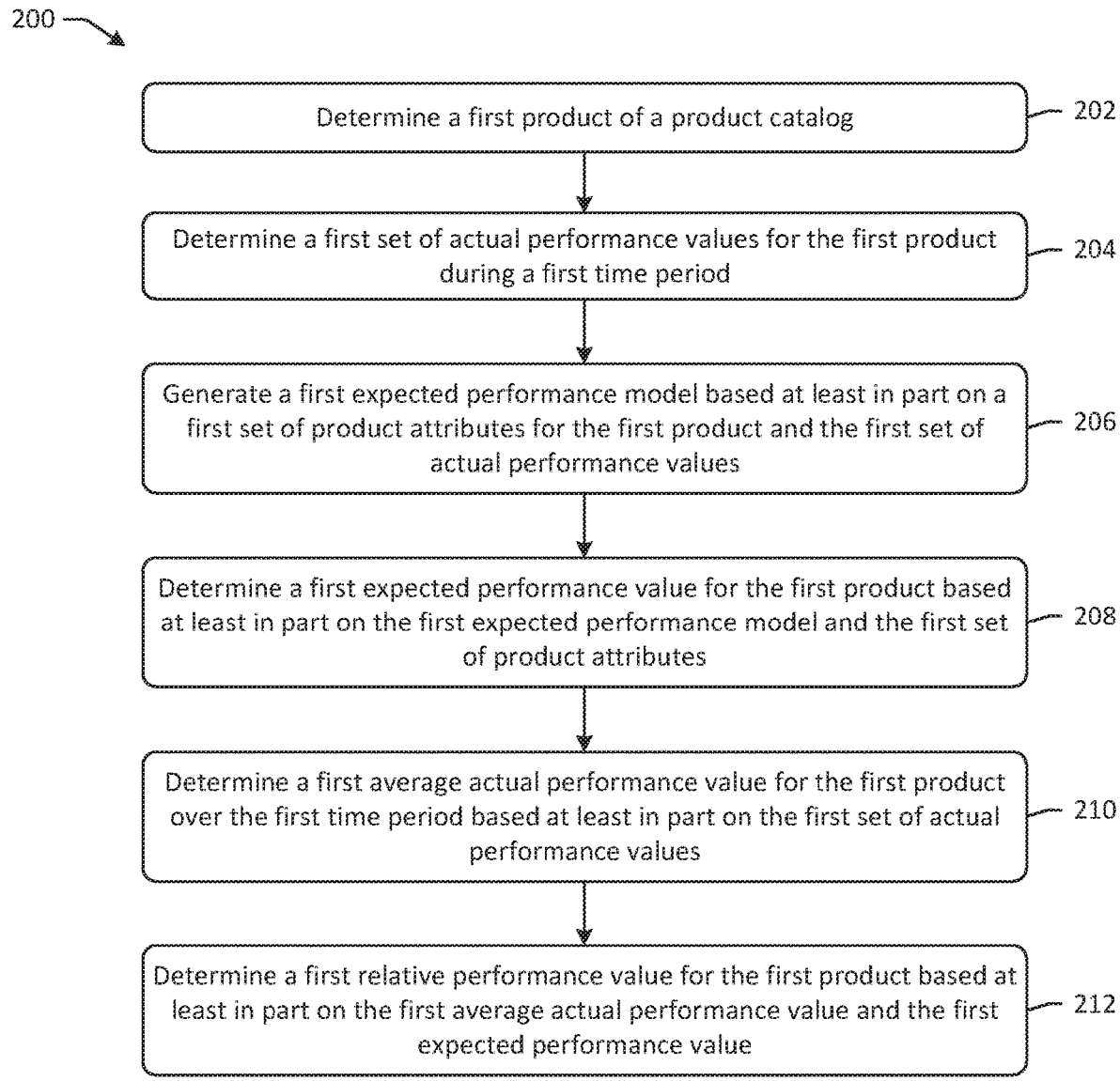
FIG. 2 is an example process flow diagram for dynamically determining relative product performance using quantitative values in accordance with one or more embodiments of the disclosure.

Referring to FIG. 2, an example process flow 200 for dynamically determining relative product performance using quantitative values in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as a product performance determination server.

At block 202 of the process flow 200, a first product of a product catalog may be determined. For example, computer-executable instructions of one or more product performance determination module(s) stored at a server may be executed to determine a first product of a product catalog. The product catalog may include, in addition to the first product, a second product. The product catalog may include any number of products offered for sale by an online retailer. In some embodiments, a server, such as a product performance determination server, may determine a first product of a product catalog of an online retailer.

At block 204 of the process flow 200, a first set of actual performance values for the first product during a first time period may be determined. For example, computer-executable instructions of one or more product performance determination module(s) stored at a server may be executed to determine a first set of actual performance values for the first product during a first time period. In some embodiments, a server, such as a product performance determination server, may determine a first set of actual performance values for the first product during a first time period.

At block 206 of the process flow 200, a first expected performance model may be generated based at least in part on a first set of product attributes for the first product and the first set of actual performance values. For example, computer-executable instructions of one or more product performance determination module(s) stored at a server may be executed to generate a first expected performance model based at least in part on a first set of product attributes for the first product and the first set of actual performance values. In some embodiments, a server, such as a product performance determination server, may generate a first expected performance model based at least in part on a first set of product attributes for the first product and the first set of actual performance values.

At block 208 of the process flow 200, a first expected performance value for the first product may be determined based at least in part on the first expected performance model and the first set of product attributes. For example, computer-executable instructions of one or more product performance determination module(s) stored at a server may be executed to determine a first expected performance value for the first product based at least in part on the first expected performance model and the first set of product attributes. In some embodiments, a server, such as a product performance determination server, may determine a first expected performance value for the first product based at least in part on the first expected performance model and the first set of product attributes.

At block 210 of the process flow 200, a first average actual performance value for the first product over the first time period may be determined based at least in part on the first set of actual performance values. For example, computer-executable instructions of one or more product performance determination module(s) stored at a server may be executed to determine a first average actual performance value for the first product over the first time period based at least in part on the first set of actual performance values. In some embodiments, a server, such as a product performance determination server, may determine a first average actual performance value for the first product over the first time period based at least in part on the first set of actual performance values.

At block 212 of the process flow 200, a first relative performance value for the first product may be determined based at least in part on the first average actual performance value and the first expected performance value. For example, computer-executable instructions of one or more product performance determination module(s) stored at a server may be executed to determine a first relative performance value for the first product based at least in part on the first average actual performance value and the first expected performance value. In some embodiments, a server, such as a product performance determination server, may determine a first relative performance value for the first product based at least in part on the first average actual performance value and the first expected performance value.

Figure 3:
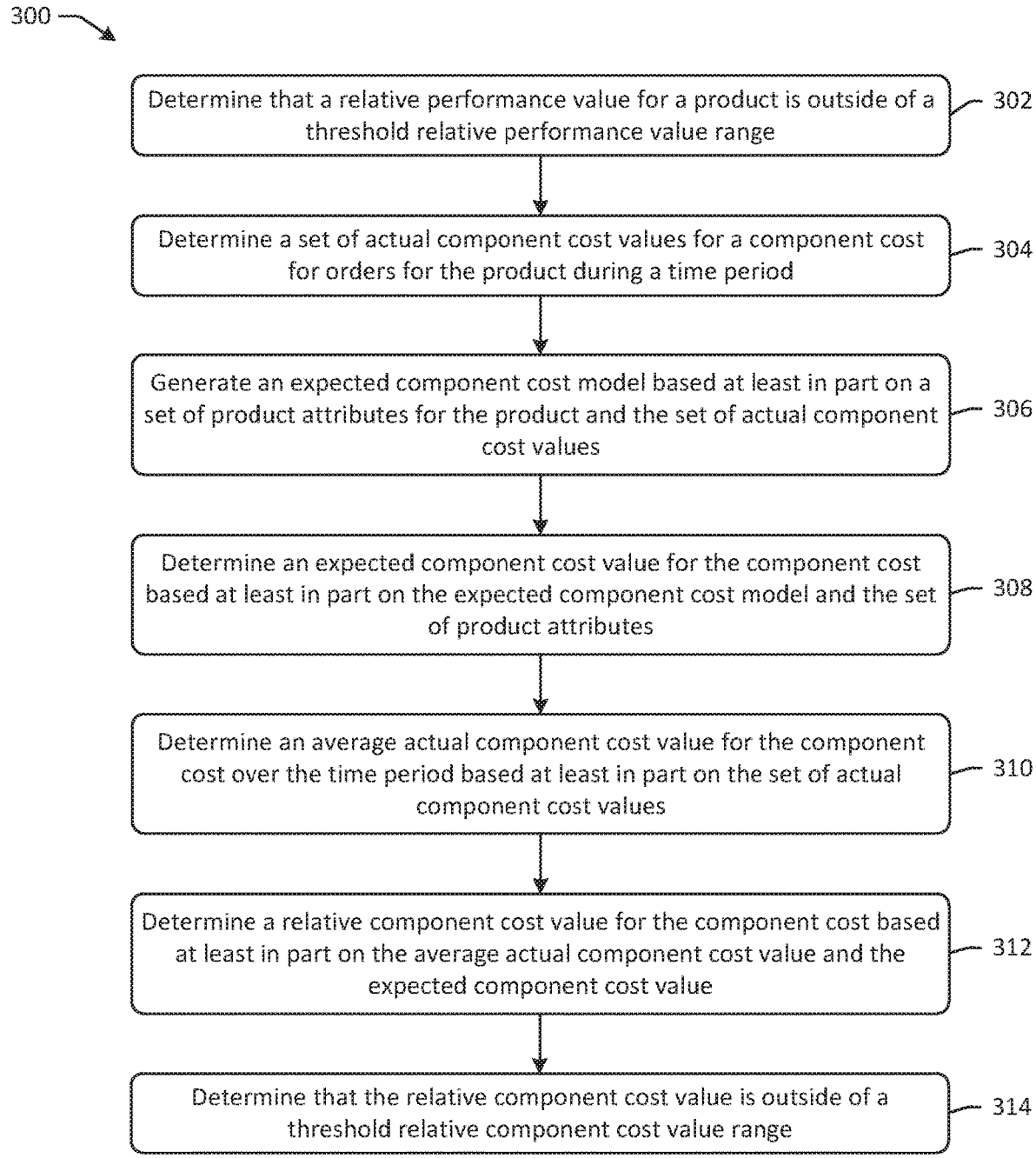
FIG. 3 is an example process flow diagram for dynamically determining a root cause of undesired product performance in accordance with one or more embodiments of the disclosure.

FIG. 3 depicts an example process flow 300 for determining a root cause of undesired product performance in accordance with one or more embodiments of the disclosure. Although certain operations are illustrated as occurring separately in FIG. 3, some or all of the operations may occur concurrently or partially concurrently across one or more computer systems. In some embodiments, the operations of the process flow 300 may be executed by a remote server, such as a product performance determination server.

At block 302 of the process flow 300, it may be determined that a relative performance value for a product is outside of a threshold relative performance value range. For example, computer-executable instructions of one or more product performance determination module(s) stored at a server may be executed to determine that a relative performance value for a product is outside of a threshold relative performance value range. In some embodiments, a server, such as a product performance determination server, may determine that a relative performance value for a product is outside of a threshold relative performance value range.

At block 304 of the process flow 300, a set of actual component cost values for a component cost for orders for the product during a time period may be determined. For example, computer-executable instructions of one or more product performance determination module(s) stored at a server may be executed to determine a set of actual component cost values for a component cost for orders for the product during a time period. In some embodiments, a server, such as a product performance determination server, may determine a set of actual component cost values for a component cost for orders for the product during a time period.

At block 306 of the process flow 300, an expected component cost model may be generated based at least in part on a set of product attributes for the product and the set of actual component cost values. For example, computer-executable instructions of one or more product performance determination module(s) stored at a server may be executed to generate an expected component cost model based at least in part on a set of product attributes for the product and the set of actual component cost values. In some embodiments, a server, such as a product performance determination server, may generate an expected component cost model based at least in part on a set of product attributes for the product and the set of actual component cost values.

At block 308 of the process flow 300, an expected component cost value for the component cost may be determined based at least in part on the expected component cost model and the set of product attributes. For example, computer-executable instructions of one or more product performance determination module(s) stored at a server may be executed to determine an expected component cost value for the component cost based at least in part on the expected component cost model and the set of product attributes. In some embodiments, a server, such as a product performance determination server, may determine that a relative performance value for a product is outside of a threshold relative performance value range.

At block 310 of the process flow 300, an average actual component cost value for the component cost over the time period may be determined based at least in part on the set of actual component cost values. For example, computer-executable instructions of one or more product performance determination module(s) stored at a server may be executed to determine an average actual component cost value for the component cost over the time period based at least in part on the set of actual component cost values. In some embodiments, a server, such as a product performance determination server, may determine an average actual component cost value for the component cost over the time period based at least in part on the set of actual component cost values.

At block 312 of the process flow 300, a relative component cost value for the component cost may be determined based at least in part on the average actual component cost value and the expected component cost value. For example, computer-executable instructions of one or more product performance determination module(s) stored at a server may be executed to determine a relative component cost value for the component cost based at least in part on the average actual component cost value and the expected component cost value. In some embodiments, a server, such as a product performance determination server, may determine a relative component cost value for the component cost based at least in part on the average actual component cost value and the expected component cost value.

At block 314 of the process flow 300, it may be determined that the relative component cost value is outside of a threshold relative component cost value range. For example, computer-executable instructions of one or more product performance determination module(s) stored at a server may be executed to determine that the relative component cost value is outside of a threshold relative component cost value range. In some embodiments, a server, such as a product performance determination server, may determine that the relative component cost value is outside of a threshold relative component cost value range.

Figure 4:
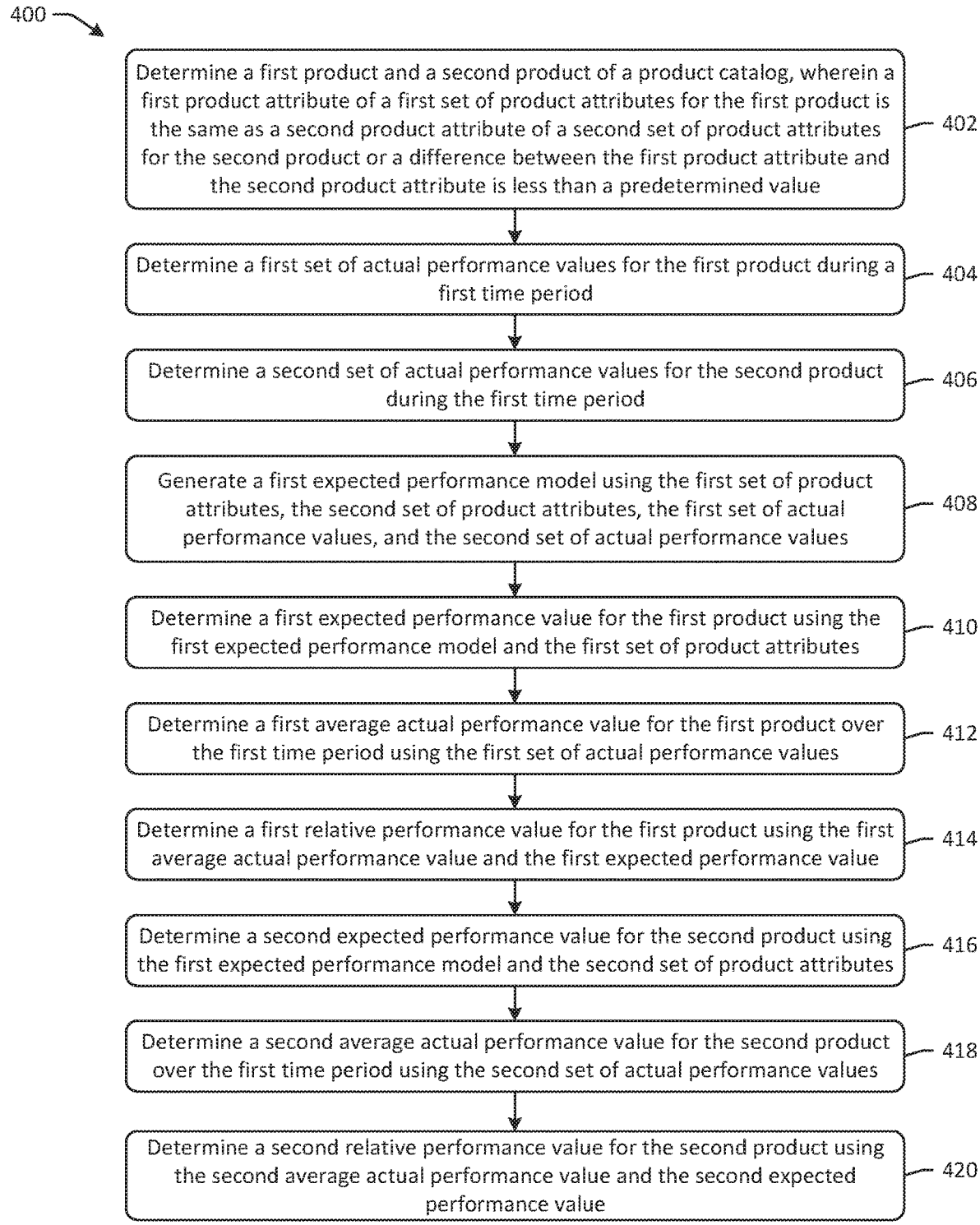
FIG. 4 is an example process flow diagram for dynamically determining relative product performance using quantitative values in accordance with one or more embodiments of the disclosure.

FIG. 4 depicts an example process flow 400 for dynamically determining relative product performance using quantitative values in accordance with one or more embodiments of the disclosure. Although certain operations are illustrated as occurring separately in FIG. 4, some or all of the operations may occur concurrently or partially concurrently across one or more computer systems. In some embodiments, the operations of the process flow 400 may be executed by a remote server, such as a product performance determination server.

At block 402 of the process flow 400, a first product and a second product of a product catalog may be determined, wherein a first product attribute of a first set of product attributes for the first product may be the same as a second product attribute of a second set of product attributes for the second product. For example, computer-executable instructions of one or more product performance determination module(s) stored at a server may be executed to a first product and a second product of a product catalog. In some instances, the product catalog may include, in addition to the first product and the second product, any number of additional products offered for sale by an online retailer. A first product attribute of a first set of product attributes for the first product may be the same as a second product attribute of a second set of product attributes for the second product. In some instances, a third product attribute of the first set of product attributes may be the same as a fourth product attribute of the second set of product attributes.

At block 404 of the process flow 400, a first set of actual performance values for the first product during a first time period may be determined. For example, computer-executable instructions of one or more product performance determination module(s) stored at a server may be executed to determine a first set of actual performance values for the first product during a first time period.

At determination block 406 of the process flow 400, a second set of actual performance values for the second product during the first time period may be determined. For example, computer-executable instructions of one or more product performance determination module(s) stored at a server may be executed to determine a second set of actual performance values for the second product during the first time period.

At block 408 of the process flow 400, a first expected performance model may be generated using the first set of product attributes, the second set of product attributes, the first set of actual performance values, and the second set of actual performance values. For example, computer-executable instructions of one or more product performance determination module(s) stored at a server may be executed to generate a first expected performance model using the first set of product attributes, the second set of product attributes, the first set of actual performance values, and the second set of actual performance values.

At block 410 of the process flow 400, a first expected performance value for the first product may be determined using the first expected performance model and the first set of product attributes. For example, computer-executable instructions of one or more product performance determination module(s) stored at a server may be executed to determine a first expected performance value for the first product using the first expected performance model and the first set of product attributes.

At block 412 of the process flow 400, a first average actual performance value for the first product over the first time period may be determined using the first set of actual performance values. For example, computer-executable instructions of one or more product performance determination module(s) stored at a server may be executed to determine a first average actual performance value for the first product over the first time period using the first set of actual performance values.

At block 414 of the process flow 400, a first relative performance value for the first product may be determined using the first average actual performance value and the first expected performance value. For example, computer-executable instructions of one or more product performance determination module(s) stored at a server may be executed to determine a first relative performance value for the first product using the first average actual performance value and the first expected performance value.

At block 416 of the process flow 400, a second expected performance value for the second product may be determined using the first expected performance model and the second set of product attributes. For example, computer-executable instructions of one or more product performance determination module(s) stored at a server may be executed to determine a second expected performance value for the second product using the first expected performance model and the second set of product attributes.

At block 418 of the process flow 400, a second average actual performance value for the second product over the first time period may be determined using the second set of actual performance values. For example, computer-executable instructions of one or more product performance determination module(s) stored at a server may be executed to determine a second average actual performance value for the second product over the first time period using the second set of actual performance values.

At block 420 of the process flow 400, a second relative performance value for the second product may be determined using the second average actual performance value and the second expected performance value. For example, computer-executable instructions of one or more product performance determination module(s) stored at a server may be executed to determine a second relative performance value for the second product using the second average actual performance value and the second expected performance value.

One or more operations of the method, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
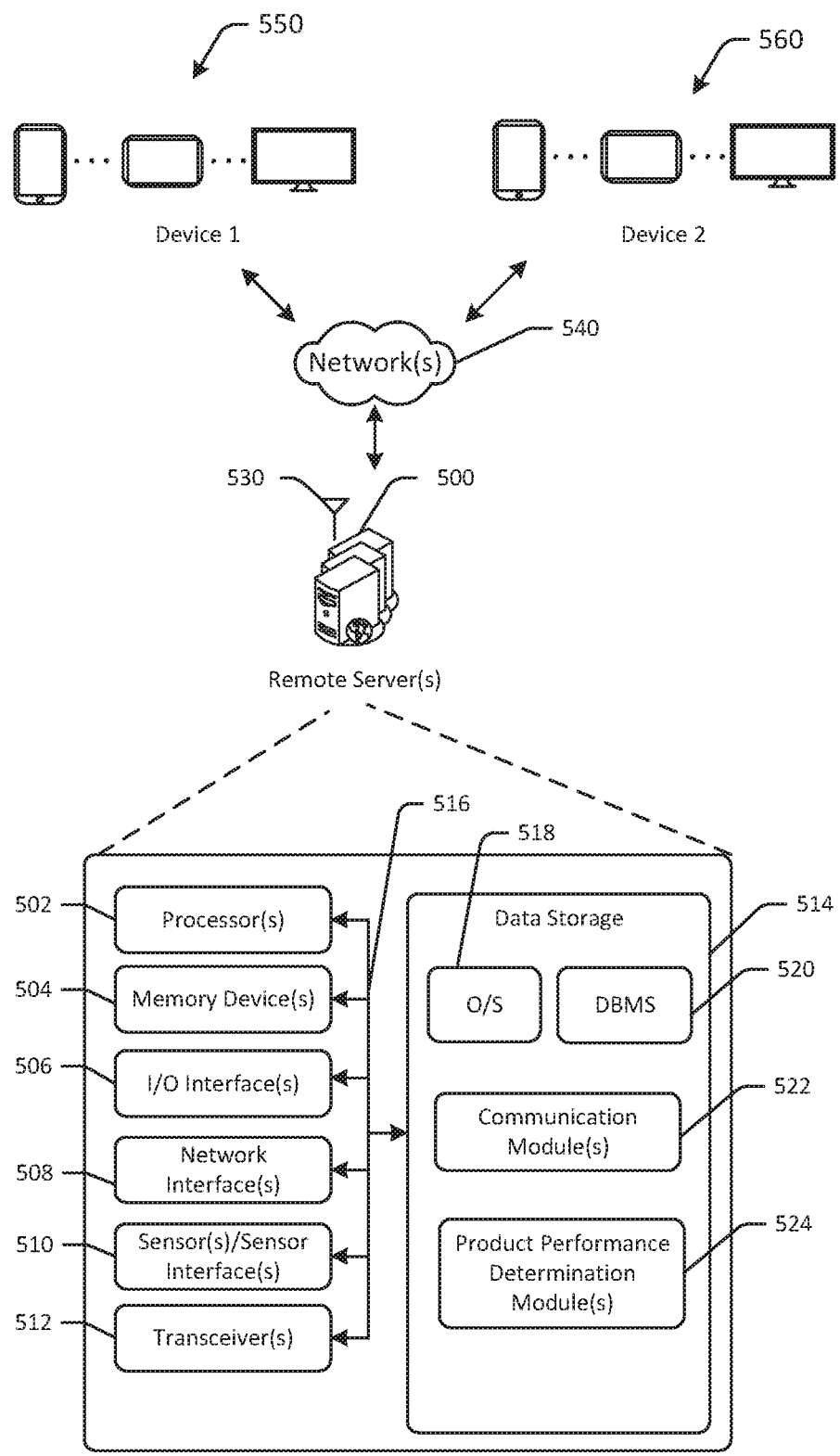
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the attribution determination server(s) of FIGS. 1-4.

The remote server(s) 500 may be configured to communicate via one or more networks with one or more servers, user devices, or the like. The remote server(s) 500 may be configured to manage one or more aspects of a number of content campaigns, such as content delivery parameters, distribution of content for presentation at respective delivery slots at a webpage or in an application, and other operations. The remote server(s) 500 may be configured to deliver or cause delivery of instructions and/or one or more pieces of content and may further be configured to determine a number of products of a product catalog which have one or more product attributes in common, determine respective average actual performance values for the products over a time period using respective sets of actual performance values for the products during the time period, generate one or more expected performance models using the respective sets of product attributes and the respective sets of actual performance values, determine respective expected performance values for the products using the one or more expected performance models and the respective sets of product attributes, and determine respective relative performance values for the products using the respective average actual performance values and the respective expected performance values. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540. The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522 and/or one or more product performance determination module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, product catalog information, transaction history information, product cost information, one or more expected performance models, one or more expected cost models, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The product performance determination module(s) 524 may include computer-executable instructions, code, or the like that responsive to execution by one or more of the processor(s) 502 may perform functions including, but not limited to, determining a first product and a second product of a product catalog, wherein a first product attribute of a first set of product attributes for the first product is the same as a second product attribute of a second set of product attributes for the second product, determining a first average actual performance value for the first product over a first time period using a first set of actual performance values for the first product during the first time period, determining a second average actual performance value for the second product over the first time period using a second set of actual performance values for the second product during the first time period, generating a first expected performance model using the first set of product attributes, the second set of product attributes, the first set of actual performance values, and the second set of actual performance values, determining a first expected performance value for the first product using the first expected performance model and the first set of product attributes, determining a first relative performance value for the first product using the first average actual performance value and the first expected performance value, determining a second expected performance value for the second product using the first expected performance model and the second set of product attributes, and determining a second relative performance value for the second product using the second average actual performance value and the second expected performance value.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A method comprising:
determining, by one or more computer processors coupled to at least one memory, a first product, a second product, and a third product of a product catalog, wherein a first product attribute of a first set of product attributes for the first product is the same as a second product attribute of a second set of product attributes for the second product or a difference between the first product attribute and the second product attribute is less than a predetermined value;
determining a first set of actual performance values for the first product during a first time period;
determining a second set of actual performance values for the second product during the first time period;
generating a first expected performance model based at least in part on the first set of product attributes, the second set of product attributes, the first set of actual performance values, and the second set of actual performance values, wherein the first expected performance model is configured to determine respective sets of expected performance values for subsequent time periods for the respective first product, second product, and third product;
determining a first expected performance value for the first product using the first expected performance model and the first set of product attributes;
determining a first average actual performance value for the first product over the first time period using the first set of actual performance values;
determining a first relative performance value for the first product using the first average actual performance value and the first expected performance value;
determining that the first relative performance value is outside of a threshold relative performance value range;
determining an expected component cost value for a set of orders for the first product based at least in part on an expected component cost model and the first set of product attributes;
determining a second expected performance value for the second product using the first expected performance model and the second set of product attributes;
determining a second average actual performance value for the second product over the first time period using the second set of actual performance values;
determining a second relative performance value for the second product using the second average actual performance value and the second expected performance value;
determining that the second relative performance value is within the threshold relative performance value range;
automatically updating a product catalog search page at a website server by modifying a position of the first product on the product catalog search page after determining that the first relative performance value is outside of the threshold relative performance value range;
transmitting an indication to the website server to present the second product at a content delivery slot; and
presenting the second product at the content delivery slot in a user interface at a user device over a computer network via a remote server.

2. The method of claim 1, further comprising:
determining respective product values for the set of orders;
determining respective product costs for the set of orders;
determining respective inbound costs for the set of orders;
determining respective shipping costs for the set of orders;
determining respective storage costs for the set of orders;
determining respective processing costs for the set of orders; and
determining the first set of actual performance values using the product values, the product costs, the inbound costs, the shipping costs, the storage costs, and the processing costs.

3. The method of claim 2, further comprising:
determining an expected product cost value for the set of orders using an expected product cost model and the first set of product attributes;
determining a relative product cost value for the set of orders using an average product cost value for a set of shipments and the expected product cost value;
determining an expected inbound cost value for the set of orders using an expected inbound cost model and the first set of product attributes;
determining a relative inbound cost value for the set of orders using an average inbound cost value for a set of shipments and the expected inbound cost value;
determining an expected shipping cost value for the set of orders using an expected shipping cost model and the first set of product attributes;
determining a relative shipping cost value for the set of orders using an average shipping cost value for a set of shipments and the expected shipping cost value;
determining an expected storage cost value for the set of orders using an expected storage cost model and the first set of product attributes;
determining a relative storage cost value for the set of orders using an average storage cost value for a set of shipments and the expected storage cost value;
determining an expected processing cost value for the set of orders using an expected processing cost model and the first set of product attributes; and
determining a relative processing cost value for the set of orders using an average processing cost value for a set of shipments and the expected processing cost value.

4. The method of claim 1, further comprising:
determining a third set of actual performance values for the first product during a second time period after the first time period;
determining a fourth set of actual performance values for the second product during the second time period;
generating a second expected performance model using the first set of product attributes, the second set of product attributes, the third set of actual performance values, and the fourth set of actual performance values;
determining a third expected performance value for the first product using the second expected performance model and the first set of product attributes;
determining a third average actual performance value for the first product over the second time period using the third set of actual performance values;
determining a third relative performance value for the first product using the third average actual performance value and the third expected performance value;
determining a fourth expected performance value for the second product using the second expected performance model and the second set of product attributes;
determining a fourth average actual performance value for the second product over the second time period using the fourth set of actual performance values; and
determining a fourth relative performance value for the second product using the fourth average actual performance value and the fourth expected performance value.

5. A method comprising:
determining, by one or more computer processors coupled to at least one memory, a first product and a second product of a product catalog, wherein a first set of product attributes of the first product is the same as a second set of product attributes of the second product or a first difference between the first set of product attributes and the second set of product attributes is less than a first predetermined value;
determining a first set of actual performance values for the first product during a first time period;
generating a first expected performance model based at least in part on the first set of product attributes, the second set of product attributes, and the first set of actual performance values, wherein the first expected performance model is configured to determine a respective expected performance value for subsequent time periods for respective products in the product catalog;
determining a first expected performance value for the first product based at least in part on the first expected performance model and the first set of product attributes;
determining a first average actual performance value for the first product over the first time period based at least in part on the first set of actual performance values;
determining a first relative performance value for the first product based at least in part on the first average actual performance value and the first expected performance value;
determining that the first relative performance value is outside of a threshold relative performance value range;
determining an expected component cost value for a set of orders for the first product based at least in part on an expected component cost model and the first set of product attributes;
automatically updating a product catalog search page at a website server by modifying a position of the first product on the product catalog search page after determining that the first relative performance value is outside of the threshold relative performance value range;
transmitting an indication to the website server to present the second product at a content delivery slot; and
presenting the second product at the content delivery slot in a user interface at a user device over a computer network via a remote server.

6. The method of claim 5, wherein:
a first product attribute of the first set of product attributes is the same as a second product attribute of the second set of product attributes for the second product or a second difference between the first product attribute and the second product attribute is less than a second predetermined value;
a third product attribute of the first set of product attributes is different than a fourth product attribute of the second set of product attributes and a third difference between the third product attribute and the fourth product attribute is greater than a third predetermined value; and
generating the first expected performance model based at least in part on a second set of actual performance values for the second product.

7. The method of claim 5, further comprising:
determining respective product values for a set of orders for the first product;
determining respective total costs for the set of orders; and
determining the first set of actual performance values based at least in part on the product values and the total costs.

8. The method of claim 7, wherein the total costs comprise at least one of a product cost, an inbound cost, a shipping cost, a storage cost, and a processing cost.

9. The method of claim 5, further comprising:
determining a relative component cost value for the set of orders based at least in part on an average actual component cost value for the set of orders and the expected component cost value; and
determining that the relative component cost value is outside of a threshold relative component cost value range.

10. The method of claim 5, wherein the first set of product attributes comprises at least one of a weight value, a dimensional value, a product value, a product type, and a brand of the first product.

11. The method of claim 5, further comprising:
determining a second set of actual performance values for the first product during a second time period after the first time period; and
generating a second expected performance model based at least in part on the first set of product attributes and the second set of actual performance values.

12. The method of claim 11, further comprising:
determining a second expected performance value for the first product based at least in part on the second expected performance model and the first set of product attributes;
determining a second average actual performance value for the first product over the second time period based at least in part on the second set of actual performance values; and
determining a second relative performance value for the first product based at least in part on the second average actual performance value and the second expected performance value.

13. The method of claim 5, further comprising:
determining a second set of actual performance values for the first product during a second time period after the first time period; and
generating a second expected performance model based at least in part on a second set of product attributes for the first product and the second set of actual performance values, wherein the second set of product attributes is different than the first set of product attributes.

14. The method of claim 13, further comprising:
determining a second expected performance value for the first product based at least in part on the second expected performance model and the second set of product attributes;
determining a second average actual performance value for the first product over the second time period based at least in part on the second set of actual performance values; and
determining a second relative performance value for the first product based at least in part on the second average actual performance value and the second expected performance value.

15. The method of claim 14, further comprising:
determining that the second relative performance value is within the threshold relative performance value range.

16. A device comprising:
at least one memory that stores computer-executable instructions; and
at least one processor configured to access the at least one memory and execute the computer-executable instructions to:
determine a first product and a second product of a product catalog, wherein a first set of product attributes of the first product is the same as a second set of product attributes of the second product or a first difference between the first set of product attributes and the second set of product attributes is less than a first predetermined value;
determine a first set of actual performance values for the first product during a first time period;
generate a first expected performance model based at least in part on the first set of product attributes, the second set of product attributes, and the first set of actual performance values, wherein the first expected performance model is configured to determine a respective expected performance value for subsequent time periods for respective products in the product catalog;
determine a first expected performance value for the first product based at least in part on the first expected performance model and the first set of product attributes;
determine a first average actual performance value for the first product over the first time period based at least in part on the first set of actual performance values;
determine a first relative performance value for the first product based at least in part on the first average actual performance value and the first expected performance value;
determine that the first relative performance value is outside of a threshold relative performance value range;
determine an expected component cost value for a set of orders for the first product based at least in part on an expected component cost model and the first set of product attributes;
automatically update a product catalog search page at a website server by modifying a position of the first product on the product catalog search page after determining that the first relative performance value is outside of the threshold relative performance value range;
transmit an indication to the website server to present the second product at a content delivery slot; and
present the second product at the content delivery slot in a user interface at a user device over a computer network via a remote server in real time.

17. The device of claim 16, wherein:
a first product attribute of the first set of product attributes is the same as a second product attribute of the second set of product attributes for the second product or a second difference between the first product attribute and the second product attribute is less than a second predetermined value; and
a third product attribute of the first set of product attributes is different than a fourth product attribute of the second set of product attributes and a third difference between the third product attribute and the fourth product attribute is greater than a third predetermined value.

18. The device of claim 16, wherein the at least one processor is further configured to access the at least one memory and execute the computer-executable instructions to:
determine respective product values for the set of orders;
determine respective total costs for the set of orders;
determine the first set of actual performance values based at least in part on the product values and the total costs;
determine a relative component cost value for the set of orders based at least in part on an average actual component cost value for the set of orders and the expected component cost value; and
determine that the relative component cost value is outside of a threshold relative component cost value range.

19. The device of claim 18, wherein the at least one processor is further configured to access the at least one memory and execute the computer-executable instructions to:
determine a second set of actual performance values for the first product during a second time period after the first time period;
generate a second expected performance model based at least in part on the first set of product attributes and the second set of actual performance values;
determine a second expected performance value for the first product based at least in part on the second expected performance model and the first set of product attributes;
determine a second average actual performance value for the first product over the second time period based at least in part on the second set of actual performance values; and
determine a second relative performance value for the first product based at least in part on the second average actual performance value and the second expected performance value.

* * * * *